United States Patent [19]
Keenan

[11] Patent Number: 5,412,176
[45] Date of Patent: May 2, 1995

[54] METHOD AND APPARATUS FOR THERMAL INSULATION OF WET SHIELDED METAL ARC WELDS

[75] Inventor: Patrick J. Keenan, San Francisco, Calif.

[73] Assignee: Massachusetts Institute of Technology, Cambridge, Mass.

[21] Appl. No.: 80,418

[22] Filed: Jun. 18, 1993

[51] Int. Cl.$^6$ ............................................... B23K 9/00
[52] U.S. Cl. .................................. 219/137 R; 219/72
[58] Field of Search .............................. 219/72, 137 R

[56] References Cited

U.S. PATENT DOCUMENTS

| | | |
|---|---|---|
| 1,902,051 | 3/1933 | Wall . |
| 1,915,913 | 6/1933 | Anderson . |
| 4,069,408 | 1/1978 | Masubuchi et al. .................. 219/72 |
| 4,154,999 | 5/1979 | Pinfold et al. ......................... 219/72 |
| 4,220,487 | 9/1980 | Andersen ............................... 148/24 |
| 4,255,641 | 3/1981 | Connell et al. ........................ 219/61 |
| 4,319,116 | 3/1982 | Kauppi et al. ......................... 219/72 |
| 4,365,144 | 12/1982 | Reich et al. .......................... 219/535 |
| 4,451,723 | 5/1984 | Gres et al. .............................. 219/98 |
| 4,527,046 | 7/1985 | Asonen ................................... 219/72 |
| 4,568,813 | 2/1986 | Andersen ................................ 219/72 |
| 4,790,887 | 12/1988 | Niinivaara ............................. 148/23 |
| 4,842,305 | 6/1989 | Kistenich et al. ...................... 285/21 |
| 4,906,313 | 3/1990 | Hill ...................................... 156/158 |

FOREIGN PATENT DOCUMENTS 2083394 3/1982 United Kingdom .

OTHER PUBLICATIONS

*Development of New Improved Techniques for Underwater Welding*—MIT Sea Grant Program, Report No. MITSG 77-9, Chon–Liang Tsai et al., pages Abstract; 26–27; 96–116, Apr., 1977, Massachusetts Institute of Technology.

*Parametric Study on Cooling Phenomena in Underwater Welding*, Chon–Liang Tsai, pp. 300–306, Jan. 18, 1979, Ph.D. Thesis, Massachusetts Institute of Technology.

"Enkele Beschouwingen Over Het Onder Water Lassen Met Beklede Elektroden" (with English translation), Bouwman et al., pp. 219–226, 1971, Lastechniek, 37.

"Study on Improvement of Locally Drying Underwater Welding Joint by Retart[d]ed Cooling Method", Satoh et al., pp. 47–54, 1982, Journal of the Japanese Welding Society, 51.

*Underwater Welding in the Deep Sea*, Erickson, pages Abstract; A–2, May, 1978, United States Government Report No. 0143000AD A075214.

"Development of Underwater Welding Techniques", Shinada et al., pp. 109–118, June, 1979, Mitsubishi Heavy Industries, Ltd., Technical Review.

"Nextel TM Filter Bags", Product Literature, 3M Ceramic Materials Department, 1991.

Primary Examiner—Clifford C. Shaw
Attorney, Agent, or Firm—Florence Fusco McCann

[57] ABSTRACT

A method for thermal insulation of a wet shielded metal arc welds including insulating a weld joint between workpieces to be welded with a synthetic insulator is provided. An apparatus for thermally insulating a wet shielded metal arc weld including a synthetic insulator is also provided.

31 Claims, 5 Drawing Sheets

FIG. 5    6μm

METHOD AND APPARATUS FOR THERMAL INSULATION OF WET SHIELDED METAL ARC WELDS

BACKGROUND OF THE INVENTION

1. Field of the Invention

The present invention relates generally to a method and apparatus for thermal insulation of wet shielded metal arc welds.

2. Description of the Prior Art

Underwater welding processes can be classified as dry or wet welding techniques based upon whether or not the welds are physically isolated from the surrounding water environment. Welds that are physically isolated from the surrounding water are classified as "dry welds" while welds which are in contact with the surrounding water are classified as "wet welds."

Dry welding techniques in current use and compatible with shielded metal arc (SMA) (as will be defined in a following section of this specification) processes include one atmosphere welding, habitat welding, dry chamber welding and dry spot welding. One atmosphere welding is generally performed in a pressure vessel maintained at approximately one atmosphere absolute. Habitat welding is performed in an open-bottom chamber having a complete atmosphere conditioning system which removes welding and diver exhaled respiratory gases and provides breathing air, thus allowing a diver to weld without wearing diving equipment. Dry chamber welding is performed in a pressurized open-bottom enclosure by a diver wearing diving equipment from which welding and exhaled respiratory gases must also be vented. In dry spot welding processes, water is displaced from the immediate vicinity of the weld area by a transparent gas-filled box or by a flow of shielding gas surrounded by a concentric ring of water jets. Dry spot welding apparatus are moved along the weld line during the welding process.

In a wet shielded metal arc welding (SMAW) process, an arc is struck in the water between an electrode and the surface being welded and the weld is formed as the welder moves the electrode along a weld line. No active thermal treatment of wet shielded metal arc welds is feasible because the welds are in direct contact with the water environment.

Typically, wet shielded metal arc welding is faster and less expensive than the already-mentioned dry welding processes and, additionally, can be used to make welds on a greater variety of geometrically complex structures. However, the use of SMAW processes is currently limited to only noncritical or temporary joints in mild steel marine structures because of the inferior quality of wet SMA welds by comparison with dry SMA welds. Wet SMA welds are generally more brittle, more porous and more crack susceptible than dry SMA welds made under otherwise equivalent arc voltage, arc current, and arc travel speed welding conditions using the same workpiece, electrode and flux materials.

The poor quality of wet SMAW welds is primarily attributed to rapid weld quenching by the surrounding water environment. During a wet SMAW process, the SMA welding arc is protected from the surrounding water by a bubble of gas produced as the electrode flux decomposes. However, the weld puddle left behind by the arc is immediately exposed to the surrounding water after arc passage, so that by contrast with those of dry SMA welds or SMA welds made on the surface in air, wet SMA weld puddles are subjected to quenching.

Quenching compromises weld quality by causing the formation of martensite in the heat affected zone (HAZ) of the weld. The HAZ is defined as the section of the weld that has been heated to above the A1 transformation temperature (723° C.) for mild steel but has not reached the melting point of the material being welded. If the rate of cooling of a steel from the transformation temperature to ambient temperature is sufficiently rapid, martensite is formed. Since the crystal structure of untempered martensite inhibits dislocation movement, untempered martensite is non-ductile and its presence in the HAZ causes the weld to be brittle, hard and lacking in toughness.

Arc electrolysis of the surrounding water produces atomic hydrogen and oxygen gases which diffuse into the weld pool. These gases can become trapped in the final weld because the outward diffusion rate throughout the rapidly solidifying metal is much slower than the initial gas diffusion rate into the molten weld pool. Entrapped hydrogen reduces weld ductility through what is known as the "cold cracking" mechanism. With time, hydrogen atoms in the weld migrate to interstitial voids where they recombine to form hydrogen gas. Pockets of hydrogen gas produce tensile stresses that can initiate trans-granular cracks. Since this phenomenon generally occurs after the weld has cooled to approximately 200° C. the effect is referred to as "cold cracking". Oxygen gas trapped in the weld also produces pores which reduce weld strength and toughness.

Rapid quenching of the weld also traps non-gaseous contaminants, such as oxide slags, in the bulk of the weld metal. These contaminants are generally less dense than iron and float to the surface of the weld pool under gradual cooling conditions. Under rapid cooling conditions, they are entrapped in the bulk weld metal and further increase weld porosity.

In addition to microstructural and chemical effects. quenching produces steep thermal gradients with resultant high residual stresses, thereby increasing weld susceptibility to crack initiation upon exposure to environmental loading. Finally, weld quenching increases weld bead convexity which makes welds more susceptible to toe cracking.

In summary, wet SMAW welds are inherently brittle, porous and susceptible to cracking. All of these defects can be directly or indirectly attributed to weld quenching. Attempts to insulate underwater welds have included flux-shielding in a wet SMAW process and mechanical shielding of a GMAW torch with strips of moderately thermally resistant insulation.

Flux-shielding in a wet SMA process presents several technical difficulties among which are difficulty in enclosing the weld joint with the flux which permits use only with simple weld joint geometries and difficulty in keeping flux applied against a joint in an overhead or vertical orientation. Furthermore, as reported in *Development of New Improved Techniques for Underwater Welding*—MIT Sea Grant Program, Report No. MITSG 77-9, Chon-Liang Tsai et al., pages Abstract; 26-27; 96-116, April, 1977, Massachusetts Institute of Technology, welds made with the flux-shielding process were inferior to welds made in air, based on the presence of harder weld metal deposits and HAZ's in the wet SMA flux-shielded welds. Finally, the presence of the flux obscures the welder's view of the weld joint which is undesirable since visual observation of the weld joint is critical to a manual welder's control of the welding process. As part of this study, weld joint insulation with ⅛ inch insulator strips made of asbestos, a naturally occurring, hazardous and toxic material was also examined.

The Satoh et al. "Study on improvement of Locally Drying Underwater Welding Joint by Retart[d]ed Cooling Method", pages 47–54, 1982, Journal of the Japanese Welding Society, 51 method of attaching thermal insulation to a GMAW torch includes insulation strips extending from the torch parallel to the weld line to shield the weld from water both immediately before and after arc passage as well as insulation strips arranged perpendicular to the weld line and in contact with the parallel insulation strips, a shielding configuration which has the undesirable effect of blocking the welder's view of the weld joint and weld line.

Thus, there exists a need for a method for thermally insulating a wet SMA weld wherein thermal insulation made of non-toxic, safely handled material having sufficiently low thermal conductivity to adequately prevent too rapid cooling of the weld joint can be readily applied to the workpiece without interfering with the welder's view of the weld joint, welding arc, weld line or weld puddle.

SUMMARY OF THE INVENTION

The invention provides a method and apparatus for wet shielded metal arc welding including use of synthetic thermal insulation made of non-toxic material having sufficiently low conductivity to adequately prevent rapid cooling or quenching of the weld which is readily applied to and removed from a workpiece or workpieces being welded and which, while in place, does not obscure or otherwise interfere with the welder's view of the weld joint, welding arc, weld line or weld puddle. Thus, the method and apparatus of the invention involves very little extra welder time for set-up and removal and is economical with respect to labor costs. Since the synthetic insulator is reusable and the synthetic material is safely handled by both above water and underwater workers, it also adds relatively little extra materials costs.

In one aspect of the invention, a method for wet shielded metal arc welding is provided including steps of:
(1) positioning a first workpiece and a second workpiece in contact to form a weld joint having first and second weld joint sides,
(2) insulating the weld joint with a synthetic insulator which can withstand elevated welding temperatures, and
(3) welding the first workpiece and the second workpiece together by exposing the weld joint to a shielded metal arc to form a weld.

According to another aspect of the invention, an apparatus for insulating a wet shielded metal arc weld at a weld joint where a first workpiece to be welded and a second workpiece to be welded are brought into contact includes:
(1) a synthetic insulator for insulating the weld joint which is able to withstand elevated temperatures encountered in a welding process and
(2) a synthetic insulator holder which keeps the synthetic insulator in thermal contact with the weld joint.

It is an object of this invention to provide a method for wet shielded metal arc welding that includes insulating the weld joint to avoid rapid cooling of the formed weld by the surrounding water environment to produce a weld having superior mechanical and microstructural properties by comparison with an uninsulated wet shielded metal arc weld made in an underwater environment.

It is a further object of the invention to provide an apparatus for insulating a wet shielded metal arc weld at the weld joint where the workpieces to be welded are brought into contact that includes a synthetic insulator for insulating the weld joint which can withstand the elevated temperatures encountered in welding and a synthetic insulator holder to keep the synthetic insulator in thermal contact with the weld joint and thus prevent rapid cooling and/or quenching of the weld joint to result in a weld having superior properties to an uninsulated wet shielded metal arc weld made in an underwater environment.

Other and further objects, features and advantages of the present invention will be readily apparent to those skilled in the art upon reading the description of the preferred embodiments which follows.

DETAILED DESCRIPTION OF THE INVENTION

Figure 1:
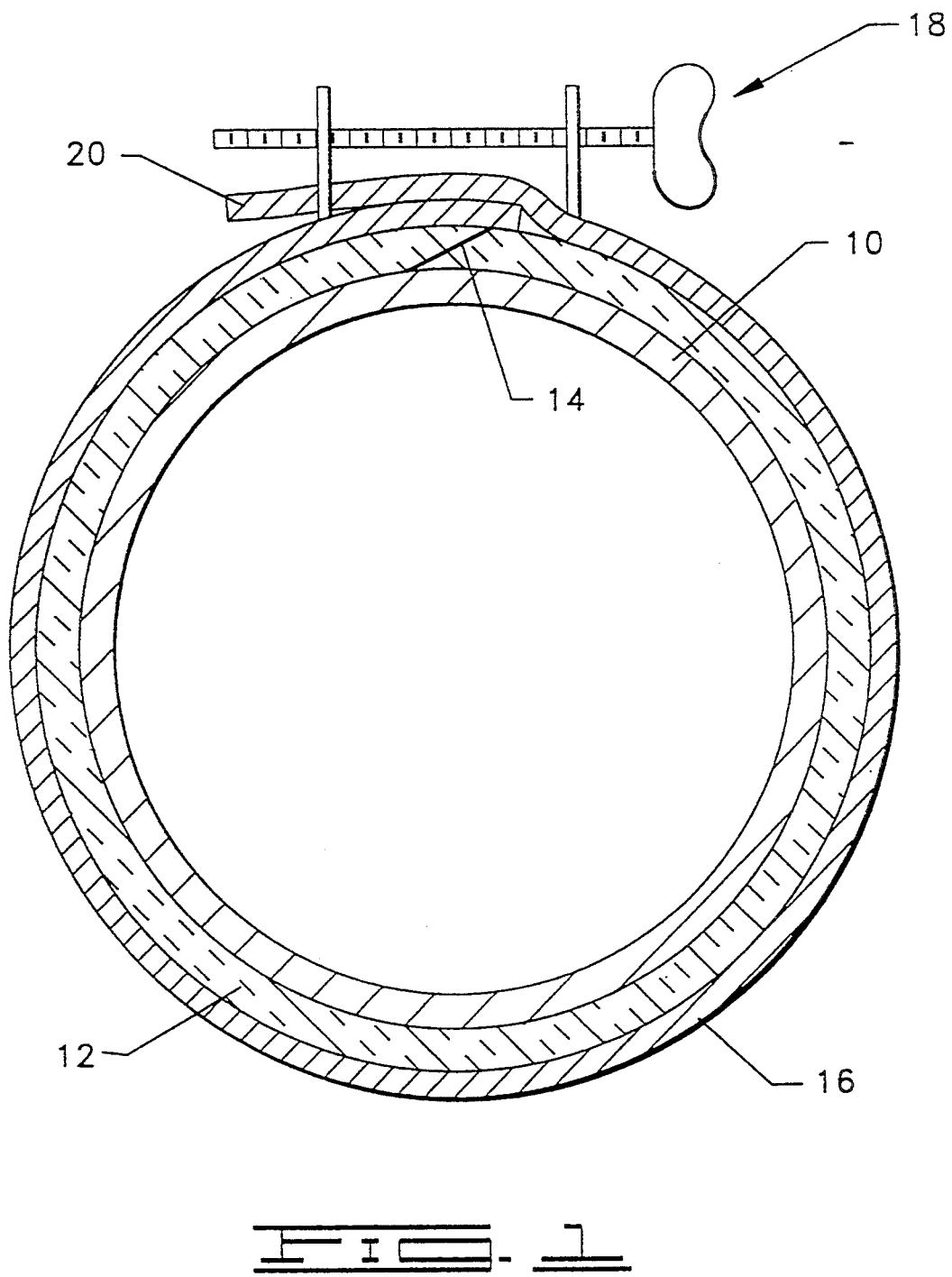
FIG. 1 is a schematic cross-section view of insulation applied to a tubular workpiece to be welded.

The invention provides a method for wet shielded metal arc welding including steps of (1) positioning first and second workpieces to be welded in contact to form a weld joint; (2) insulating the weld joint with a synthetic insulator that can withstand elevated welding temperatures and (3) welding the workpieces together by exposing the weld joint to a shielded metal arc to produce a weld which can also be referred to as a weldline.

An apparatus for insulating a wet shielded metal arc weld at a weld joint where workpieces to be welded are brought into contact and including (1) a synthetic insulator for insulating the weld joint which can withstand elevated welding temperatures and (2) a synthetic insulator holder for holding the synthetic insulator in thermal contact with the weld joint is also provided.

As used herein in the specification, as well as in the claims which follow, the term "shielded metal arc welding" is used broadly to refer to any welding method wherein the metal arc is shielded by any fluid medium, such as a gas or liquid, or by a solid. Thus, the term "shielded metal arc welding" as used herein in the specification and in the claims which follow refers to and is intended to include a welding technique wherein the metal arc is shielded by a solid or liquid flux material which is conventionally referred to in the art as "shielded metal arc welding" to a welding technique wherein the metal arc is shielded by an inert gas, which is conventionally referred to in the art as "gas metal arc welding" as well as to a metal arc welding technique wherein a non-consumable tungsten arc shielded by an inert gas, conventionally known in the art as "tungsten inert gas welding". A "shielded metal arc" is an arc shielded by a fluid such as a gas or liquid, or by a solid.

The first and second workpieces being joined by welding can be characterized by a first and second workpiece geometry which can be a flat plate or tubular geometry.

The first and second workpieces being joined can be made of an iron-based alloy such as mild steel, high yield steel, high strength low alloy steel, thermal mechanical control process steel or high tensile strength steel. Low alloy steel can contain less than about 0.2% carbon. The workpieces being joined can be composed of the same iron-based alloy or can be made of different iron-based alloys which are compatible for welding, as is readily determined by one skilled in the art.

The workpieces to be welded can be brought into contact to form a weld joint such as a butt weld joint, a fillet weld joint, a seam weld joint or a bead-on-plate weld joint. The synthetic insulator can be placed on one of the workpieces on its side facing the welder or the synthetic insulator can be applied to both workpieces being welded together on the side of the workpieces facing the welder. The synthetic insulator can be arranged so that the weld joint, formed where the workpieces being welded come into contact, as well as the weld line, formed when the shielded metal arc is applied to the weld joint, the weld pool and the finished weld are all visible to the welder allowing him or her maximum control over the welding process.

Any type of shielded metal arc and electrode suitable for underwater welding can be used in the method of the invention. Undermatched ferritic electrodes which increase weld metal ductility can be used to aid in minimizing weld crack formation. Fully austenitic electrodes which limit hydrogen input to the weld metal and retard crack formation because of the relatively high hydrogen solubility of gamma iron can also be used.

The synthetic insulator is selected so that it can withstand the elevated temperatures encountered by a material positioned in close proximity, typically less than about 0.75 cm depending upon the particular details of the welding process such as weld geometry and electrode thickness, from the shielded metal arc during a welding process. Such exposure temperatures are typically in excess of about 1200° C. depending upon the welding process. The synthetic insulator should, in addition to high thermal stability, have a low thermal conductivity which is appropriate to reduce through-insulation heat loss to the environment to obtain the appropriate weld cooling rate. In order to reduce the weld cooling rate, it is also important that water be prevented from contacting the weld line as it is formed during the weld process and, therefore, the synthetic insulator should be selected so that it has a synthetic insulator air permeability in the range of from about $40m^3/m^2min$ to about $1m^3/m^2min$, more preferably in the range of from about $38m^3/m^2min$ to about $5m^3/m^2min$ and most preferably in the range of from about $12m^3/m^2min$ to about $5m^3/m^2min$. Air permeability is a parameter typically used to characterize the permeability of a woven fabric-like material and provides a relative indication for comparison of different materials with respect to water permeability since water, like air, is a fluid. The synthetic insulator can be a fabric woven from chemically synthesized long, continuous fibers such as alumina-boria-silica fibers, or a laminate or mixture of alumina-boria-silica fibers and silicone rubber, which can include a high volume fraction of alumina-boria-silica fibers. Silicone rubber provides increased impermeability to the surrounding water. Chemically synthesized fibers are fibers produced according to a manufacturing process and are not naturally occurring mineral fibers which occur in nature in fiber-like form.

The synthetic insulator can be flexible and can be shaped to conform to the first workpiece shape and, optionally, shaped to conform to the second workpiece shape as well. The synthetic insulator can be as thin as feasible to minimize transverse interference which could limit electrode angle during welding. The synthetic insulator thickness can be made up of a single ply of synthetic insulator or can be formed by applying multiple layers of the synthetic insulator to the first workpiece to be welded, or, optionally, to both workpieces to be welded.

The method can include an additional step of heating the weld joint to a weld joint temperature which is selected so that the weld joint is kept at a temperature greater than the ambient temperature of the surrounding underwater environment but is kept at a weld joint temperature which is less than the temperature at which any solid-solid phase transformation occurs in the particular material or materials being welded together. This heating step can be performed by providing an electrical resistance heater within the synthetic insulator and applying appropriate power to the electrical resistance heater to maintain the desired temperature in a manner which can be readily determined by one skilled in the art.

Finally, the method can include a further step of removing the synthetic insulator. Under conditions of ordinary use by a professional welder, such that the synthetic insulator does not undergo prolonged, direct exposure to the metal arc, the synthetic insulator is typically not damaged after a single welding operation and can be removed from the workpiece for reuse in subsequent welding operations.

The invention also provides an apparatus for insulating a wet shielded metal arc weld, as has been previously defined, at a weld joint where a first workpiece to be welded contacts a second workpiece to be welded. The insulating apparatus includes a synthetic insulator for insulating the weld joint which can withstand an elevated weld temperature, as has been defined earlier, and a synthetic insulator holder which holds the synthetic insulator in thermal contact with the weld joint.

The apparatus of the invention can be used with first and second workpieces characterized by flat plate geometries or tubular geometries.

The first and second workpieces can be made from an iron-based alloy such as a mild steel, high yield steel, high strength low alloy steel, thermal mechanical control process steel or high tensile strength steel.

The synthetic insulator can be in contact with the first workpiece welder-facing side, or optionally with both first and second workpiece welder-facing sides and, is thus, readily applied to complex geometries where an interior side of the workpiece away from the welder is within a part such as a tubular member or otherwise inaccessible to the welder. The insulator can also be positioned at the top and bottom of the weld joint, where the weld begins and ends, respectively.

The synthetic insulator can withstand elevated welding temperatures greater than 1200° C. depending upon the welding process encountered in metal arc welding processes. The synthetic insulator is also characterized by a synthetic insulator air permeability in the range of from about $40m^3/m^2min$ to about $1m^3/m^2min$, more preferably in the range of from about $38m^3/m^2min$ to about $5m^3/m^2min$ and most preferably in the range of from about $12m^3/m^2min$ to about $5m^3/m^2min$.

The synthetic insulator can be a fabric woven from chemically synthesized, long, continuous fibers such as alumina-boria-silica fibers, or a laminate or mixture of alumina-boria-silica fibers and silicone rubber, which can include a high volume fraction of alumina-boria-silica fibers. The synthetic insulator can be as thin as feasible to minimize transverse interference which could limit electrode angle during welding. The synthetic insulator thickness can consist of a single ply of the synthetic insulator or can be made up of multiple layers of synthetic insulator material.

The insulating apparatus can further include a heater to keep the weld joint at a weld joint temperature which is greater than the ambient temperature of the surrounding underwater environment but which is less than the temperature at which the material or materials being welded undergo any solid-solid phase transformation. The heater can be an electrical resistance heater provided with an appropriate power supply and temperature controller, as can be designed by one skilled in the art, to heat and maintain the weld joint and weld line formed during welding at the desired temperature.

The synthetic insulator can be reusable under conditions of ordinary use where the synthetic insulator is not subjected to prolonged, direct exposure to the metal arc in such a fashion as would degrade the synthetic insulator mechanical properties.

The synthetic insulator holder holds the synthetic insulator firmly against the workpiece or workpieces being insulated so that water does not intervene between the insulator and workpiece and force the insulator away from the workpiece or workpieces so that it ceases to be in thermal contact with the workpiece or workpieces thereby compromising its insulating properties.

The synthetic insulator holder can be an adjustable radius clamp as shown in FIG. 1 when the workpiece or workpieces to be welded have a tubular geometry.

FIG. 1 shows a cross-section of a workpiece 10 having tubular geometry with insulation material 12 having insulation seam 14 held in place around tubular member 10 by adjustable radius band clamp 16. Adjustable radius band clamp 16 can be made of any flexible material which can be tightened with a clamp securing mechanism such as adjustable radius clamp securing mechanism 18 to hold insulation 12 firmly in place around workpiece 10 and in thermal contact with the workpiece. FIG. 1 shows excess clamp material 20 which remains after clamp securing mechanism 18 has been tightened.

Figure 2:
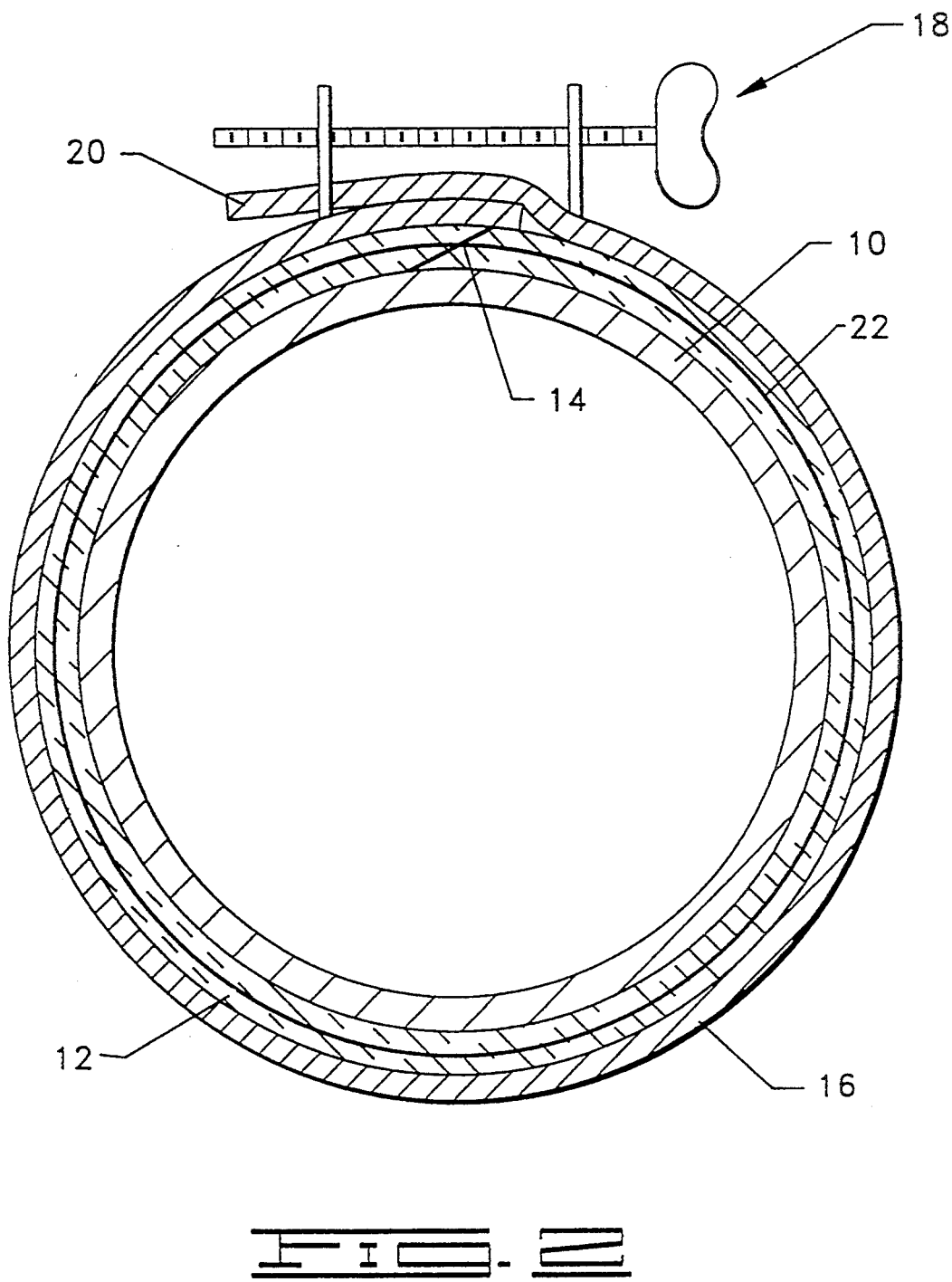
FIG. 2 is a schematic cross-section view of insulation also containing an electric resistance heating element and applied to a tubular workpiece to be welded.

FIG. 2 shows an insulation configuration around a tubular workpiece similar to that shown in FIG. 1 but with the addition of electrical resistance heating element 22.

Figure 3:
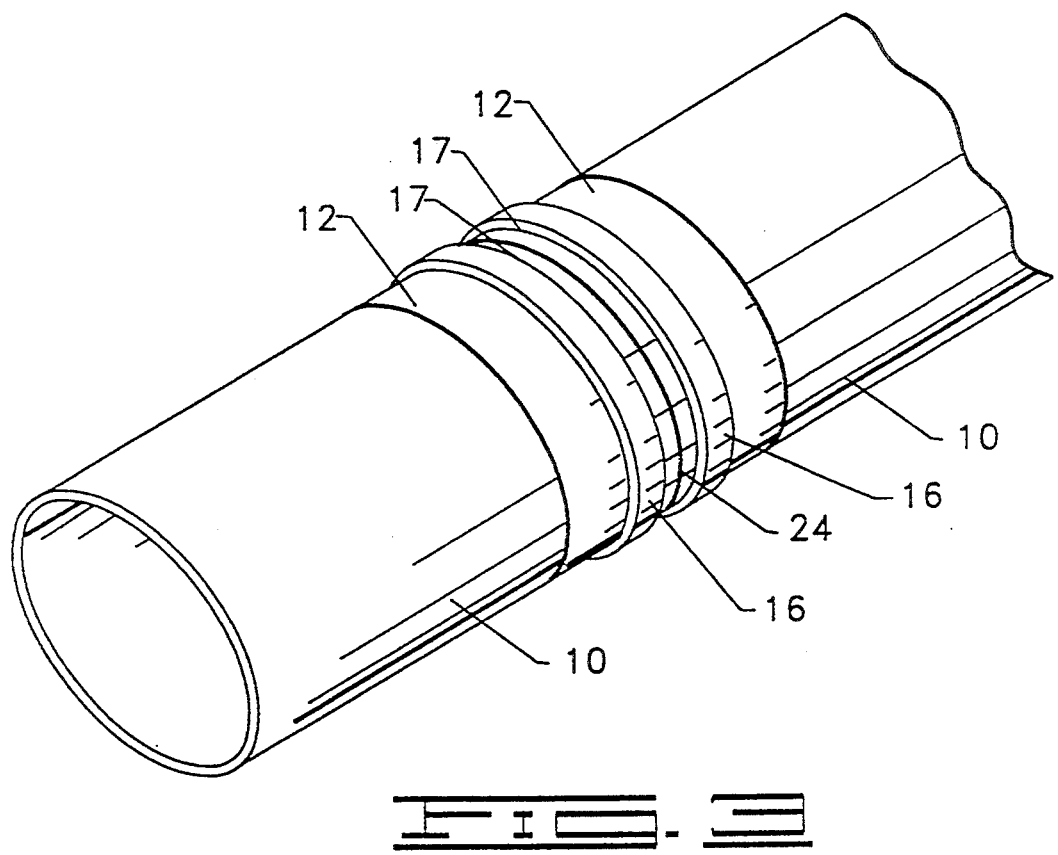
FIG. 3 is a schematic illustration of insulation on both sides of a weld joint formed between two tubular workpieces to be welded together.

FIG. 3 is an isometric view of synthetic insulator 12 wrapped around two tubular workpieces 10 to be joined at weld joint 24 and having synthetic insulators 12 secured on each side of weld joint 24 by adjustable radius clamps 16. If adjustable radius clamps 16 are made out of a thermally conductive material such as metal, it is important to insure that adjustable radius clamps 16 are covered with a thermally insulating material where they are in contact with weld joint 24 at band clamp edges 17 so that the adjustable radius clamps 16 do not, in fact, act as thermally conductive heat sinks thereby defeating the thermal insulation function of synthetic insulators 12.

An adjustable radius band clamp such as that shown in FIGS. 1-3, allows synthetic insulator 12 to be quickly and easily installed around a workpiece to be welded and involves a minimal amount of extra time or work on the part of the welder. Use of such a configuration and clamping mechanism is also readily performed under the conditions and somewhat restricted mobility encountered by a welder wearing diving equipment.

Alternatively, the synthetic insulator can be held in place with a mechanically interlocking-type fastener such as Velcro TM or can be held against the workpiece using magnets embedded in the synthetic insulator.

Figure 4:
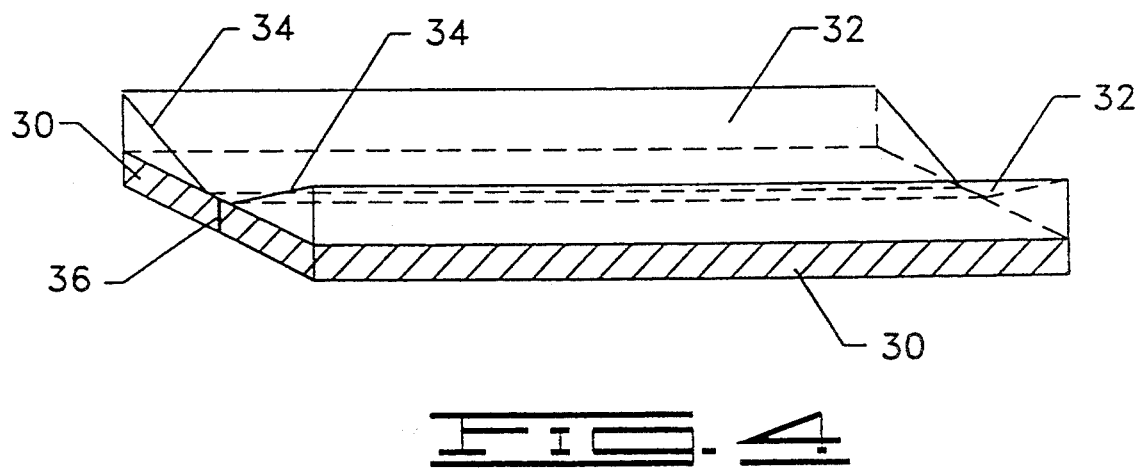
FIG. 4 is a schematic illustration of insulation applied to both sides of a weld joint formed between two flat plates to be welded together.

FIG. 4 shows the method and apparatus of the invention as used with flat plate workpieces. As shown in FIG. 4, synthetic insulator strip 32 having edges 34 angled at 45° with respect to weld joint 36 formed where plates 30 are brought into contact can be used with a flat plate geometry.

In order further to illustrate the method and apparatus of the present invention, the following example is provided. The particular materials and welding conditions utilized in the example are meant to be illustrative of the present invention and not limiting thereto.

EXAMPLE 1

The following example is provided to show how the quality of a wet shielded metal arc weld thermally insulated according to the method of the invention has superior properties by comparison with those of an uninsulated wet shielded metal arc weld made under equivalent welding conditions but without being thermally insulated.

Welds were made manually with base plates submerged in a small reservoir filled with water and with the welder standing outside the reservoir welding through the air-water interface. Surface hardness testing and microscopic weld examination were used to evaluate the effects of insulation on the welds.

Since changes in travel rate and arc length inherent in manual welding produce variations in heat input, a procedure was developed that separated the effects of variations in heat input from insulation effects. Welds were insulated only along one side and the remaining side was left uninsulated. Each weld, with its specific heat input and insulation configuration, could then be tested independently to evaluate the effects of insulation.

A welding jig was constructed that consisted of a base plate platform with securing clamps, electrode guides, insulation clamping screws, and a ground attachment point which was able to accommodate base plates of varying thickness. Insulation materials were then clamped onto one side of the base plate with the edge of the insulation closest to the welding line positioned directly under the electrode guide so that all welds were made with insulation adjacent to and at a constant distance from the weld line. (Control welds were made with no insulation on either side of the base plate to establish baselines for the hardness testing phase of the experimental procedure). The welding jig and base plate were then placed in a reservoir containing 35.5 liters of fresh water, and the welding power supply ground was attached to the jig/base plate assembly. Welds were made using the electrode guides to ensure that the arc was directly adjacent to the insulation material during welding. Bead-on-plate welds were made because of the simplicity of this weld geometry.

Three types of insulation were tested. All were fabrics woven from 3M Nextel TM 312 alumina-boria-silica fibers. The primary difference between the fabrics used was permeability.

The Nextel TM fabrics were chosen because of their stability when exposed to high temperatures (no shrinkage or strength loss after continuous exposure of up to 1204° C.) and because of their low thermal conductivity (approximately 0.16W/m° C. at 650° C.). High temperature stability allowed the insulation to be placed immediately adjacent to the weld line, thereby optimizing its effect on heat flow. Low thermal conductivity reduces through-insulation heat loss to the environment and is therefore of primary importance in reducing weld cooling rates. Additionally, the Nextel TM fabrics are pliable, can be made to conform to any geometry, and are, therefore, practical insulating materials. Table 1 lists the properties of the three Nextel TM fabrics tested.

TABLE 1

| Fabric Style | Insulation Fabric Properties | | |
|---|---|---|---|
| | Thickness per Ply (mm) | Weave Type | Air Permeability (1) $\frac{m^3}{m^2/min}$ |
| AF-62 | 0.81 | Double Layer | 38 |
| AF-40 | 1.27 | 5 Harness Satin | 11.6 |
| AB-22 | 0.56 | 5 Harness Satin | 5.3 |

TABLE 1-continued

| Fabric Style | Insulation Fabric Properties | | |
|---|---|---|---|
| | Thickness per Ply (mm) | Weave Type | Air Permeability (1) $\frac{m^3}{m^2/min}$ |
| (filter bag) | | | |

(1) At constant pressure differential equal to 0.5 inches of water

A Miller Synchrowave 350 welding machine set for direct current straight polarity was used as a power source. Welding current was 150 amps. Open circuit voltage was 57.6 volts and average arc voltage during welding was 29 volts. All welding was performed with BROCO Softouch E70XX ⅛ inch diameter wet welding electrodes.

Temperature measurements were made in the welding reservoir immediately before, during, and upon completion of welding. Measurements were made at two positions, one at the edge of the plate being welded, and the other at a location in the reservoir removed from the welding site. K-type thermocouples (with a temperature measurement range of −200° C. to 1370° C.) connected to a calibrated OMEGA RD-103-AR chart recorder were used to make the temperature measurements. All welds were timed, and bead length and average bead width recorded. Experimental weld parameters are presented in Table 2.

TABLE 2

Experimental Weld Parameters (1)

| Weld No. | Bead Lgth/Avg Bead Width cm/cm | Travel Rate (cm/s) | Base Metal (2) | Reservoir Temp. Prior to Welding (deg. C.) | Reservoir Temp. Increase During Welding (deg. C.) (3) | Insulation (8 plys applied to 1 side of weld for MS, 4 plys to both sides for HTS) |
|---|---|---|---|---|---|---|
| Control 1 | 13.2/0.5 | 0.73 | MS | 22.9 | 0.1 | N/A |
| MS1 | 12.5/0.5 | 0.65 | MS | 22.9 | 0.2 | AF-40 |
| MS2 | 9.2/0.5 | 0.56 | MS | 21.3 | 0.0 | AF-40 |
| MS3 | 12.7/0.5 | 0.74 | MS | 15.3 | 0.0 | AF-40 |
| MS4 | 13.0/0.5 | 0.74 | MS | 18.6 | 0.2 | AF-40 |
| MS5 | 13.2/0.5 | 0.73 | MS | 20.7 | 0.1 | AF-40 |
| Control 2 | 12.0/0.4 | 0.71 | HTS | 23.9 | 0.1 | N/A |
| HTS1 | 13.0/0.4 | 0.72 | HTS | 24.0 | 0.1 | AB-22 |

(1) All welds made with BROCO Softouch E70XX ⅛ inch diameter wet welding electrodes with 150 amp welding current and 29 volt average arc voltage. Base plate dimensions were 6 inches in the direction of the weld line and 4 inches perpendicular to the weld for MS, and 5.5 and 8 inches respectively for HTS.
(2) CE of MS (ASTM A36 mild steel) = 0.285 and CE of HTS (DH-36 High Tensile Strength Steel) = 0.41. Base plate thicknesses were 0.25 inch for MS and 0.5 inch for HTS.
(3) From average of temperatures at both thermocouple locations.

Hardness of heat affected zones is the most basic property in assessing the weldability of steels and, HAZ hardness tests are generally conducted as part of a welding procedure approval test. As stated earlier, HAZ hardness is directly related to the weld cooling rate.

Consequently, the primary means used in this experiment to evaluate the effects of surface insulation on weld cooling rates was HAZ hardness testing. Hardness was measured on all mild steel welds with an Acco Wilson Model 4JR Rockwell Hardness Tester. Welds were not ground prior to hardness testing because grinding heat input would have had an uncontrolled effect on surface hardness. In addition to hardness testing, the HTS welds and one mild steel weld were sectioned, polished, acid etched, and visually inspected using a Hirox Co. LTD. Model KN-2200 MD2 fiber optic microscope.

More than fifty trial welds were made on mild steel plates during the initial phase of the manual welding experiment. The purpose of these welds was to practice the welding technique so that welds with relatively consistent travel rate and bead profile could be attained. At first, the majority of the welds had longitudinally varying bead profiles. Four of these trial welds (two of which had been insulated with AF-62 fabric and two with AF-40) were tested for hardness. The results indicated that the less permeable AF-40 fabric provided better insulation than more permeable AF-62 fabric. The less permeable insulation was more effective in displacing water from the plate surface, limiting convection, and thereby reducing the weld cooling rate. Consequently, welds made with AF-40 insulation showed a reduction in surface hardness as compared to the welds insulated with AF-62. Because of bead irregularities, measured hardness values for these welds were considered unsuitable for use as experimental data. However, based on the conclusion that AF-40 was a more effective insulating material than AF-62, further tests were performed solely with the less permeable AF-40 and AB-22 materials.

The Nextel TM fabrics proved to be quite durable. They were capable of being used repeatedly, and even when subjected directly to the submerged arc, they did not melt.

Eight test welds were made. Six were made on 0.25 inch thick 0.285 CE (carbon equivalent) mild steel plate.

Carbon contents of steels are often compared using an index known as carbon equivalent (CE). (Actually CE is a measure of both carbon content and, to a lesser extent, the contents of various other alloying elements. Positive coefficients are assigned to alloying elements that generally inhibit weldability, and negative coefficients to elements that improve weldability). Different definitions of CE are encountered in the literature. The most common definition is presented below in equation 1:

$$\% C + \frac{\% Mn}{6} + \frac{\% Cr}{10} - \frac{\% Mo}{50} - \frac{\% V}{10} + \frac{\% Cu}{40} + \frac{\% Ni}{20} \quad [1]$$

The American Welding Society (AWS) has defined a specific relationship to be used when computing CEs for wet SMAW. This definition—equation [2]—is more conservative (i.e. gives a higher CE for an equivalent material) than equation [1] in recognition of the technical difficulties associated with wet SMAW.

$$\% C + \frac{\% Mn}{6} + \frac{\% Cr + \% Mo + \% V}{5} + \frac{\% Ni + \% Cu}{15} \quad [2]$$

Figure 5:
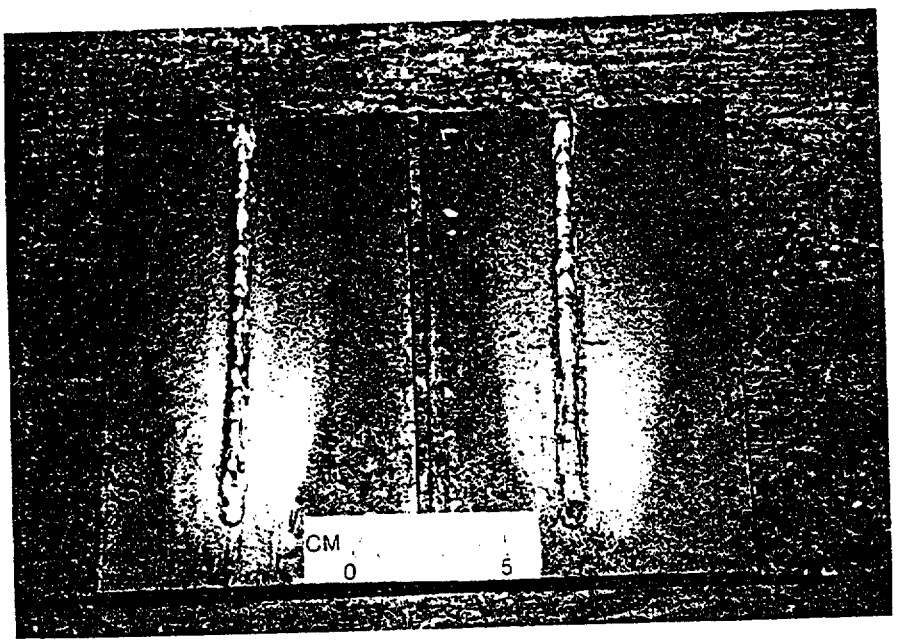
FIG. 5 is a photograph showing typical mild steel welds obtained using the method of the invention.

These mild steel welds consisted of one control weld, which was not insulated, and five welds that were insulated on one side of the weld line. After completion of the mild steel testing phase, two experimental welds were made on 0.5 inch thick 0.41 CE high tensile strength steel (HTS). This grade of steel was chosen because underbead cracking is observed in wet welds made on plates with CE's greater than 0.40. Welding parameters for all experimental welds were presented previously in Table 2. A photograph of two typical experimental mild steel welds is shown in FIG. 5.

Figure 6:
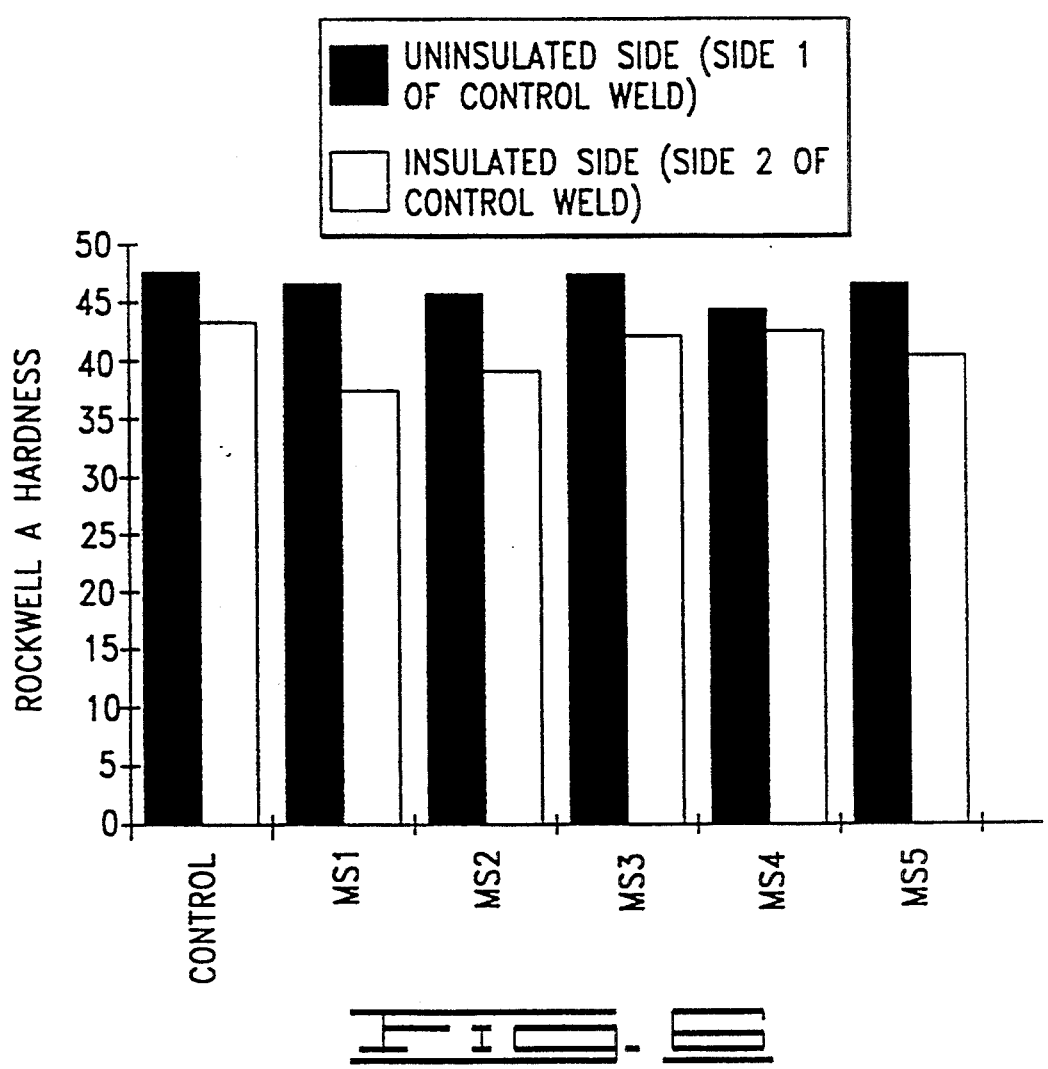
FIG. 6 is a graph showing the mean Rockwell A hardness values for several insulated wet shielded metal arc mild steel welds compared to uninsulated wet shielded metal arc mild steel welds made under otherwise equivalent experimental conditions.
Figure 7:
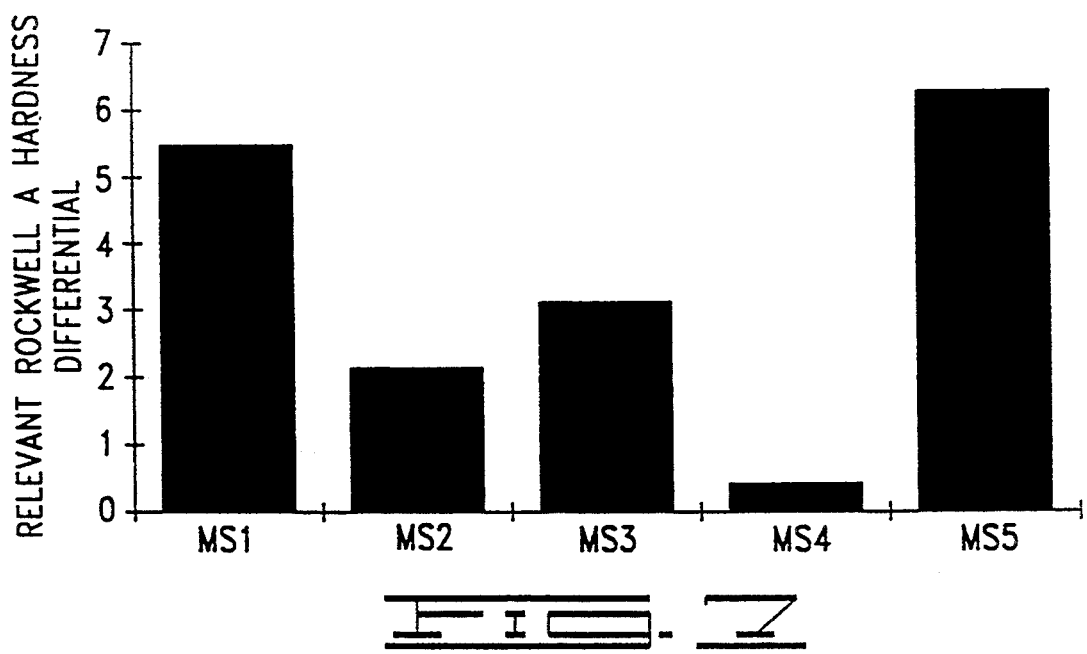
FIG. 7 is a graph showing the difference in mean Rockwell A hardness between wet shielded metal arc mild steel welds insulated according to the method of the invention and uninsulated wet shielded metal arc mild steel welds made under otherwise equivalent experimental conditions.

Hardness testing results from the mild steel plate welds are presented in FIGS. 6 and 7. In each case, ten hardness readings were taken on each side of the weld line. The weld crown was used as a lateral reference because of the relative ease of identifying the apex of the crown. (The exact location of the weld toe would have been more difficult to identify with repeatable accuracy). Hardness was measured at a lateral offset of 1/4 inch from the weld crown because this was the closest that the weld could be approached with the indenter tip of the testing device without the indenter bale impacting the weld bead reinforcement. From visual inspection, it appeared that measurements taken at the 1/4 inch offset distance were within the weld HAZ. Hardness readings were taken in pairs (one reading on the insulated side and one on the uninsulated side) at random locations along the weld. The Rockwell A testing scale was chosen because it provided readings close to 50% scale deflection for the samples being evaluated.

To determine the statistical significance of the results, standard statistical analysis techniques were used.

The data presented in FIGS. 6 and 7 show that all five insulated mild steel welds demonstrated decreased surface HAZ hardness on the insulated sides of the weld beads. Furthermore, in addition to this insulation effect being demonstrated in all five welds, the results are statistically significant even after measurement error has been considered. FIGS. 6 and 7 graphically depict the measured mean hardness differences between insulated and uninsulated sides of all mild steel welds, and the relevant Rockwell A hardness differentials which are defined as |((Uninsulated Side Sample Mean Hardness)—(Insulated Side Sample Mean Hardness))—(Hardness Difference Between Control Weld Sides 1 and 2)| between sides for welds MS1 through MS5, respectively.

It is important to note that one-sided surface insulation would theoretically be less effective in reducing weld cooling rates—and surface HAZ hardness—than two sided or full insulation, because of asymmetric heat flow in the former. The weld centerline is not a symmetry plane, and greater heat flux through the less thermally resistant uninsulated side would be expected. The result would be a faster overall cooling rate for a weld insulated on one side than for a fully insulated weld.

Microscopic examination of the two 0.41 CE HTS welds revealed differences in the fusion line between the uninsulated and fully insulated welds. At 10X magnification, the uninsulated weld fusion line was traversed by numerous perpendicular underbead cracks. This form of cracking can be attributed to rapid contraction of the HAZ as a result of weld quenching. By contrast, the fusion line of the insulated weld was smooth, and underbead cracks were not apparent.

What is claimed is:

1. A method for wet shielded metal arc welding comprising:
   (1) positioning a first workpiece and a second workpiece in contact to form a weld joint having a first weld joint side substantially parallel to a second weld joint side;
   (2) insulating said weld joint with a synthetic insulator capable of withstanding an elevated welding temperature by positioning said synthetic insulator at a synthetic insulator location displaced with respect to said weld joint so that said weld joint remains visible to a welder performing said method; and
   (3) welding said first workpiece and said second workpiece together by exposing said weld joint to a shielded metal arc to produce a weld.

2. The method of claim 1 wherein in step (1) of positioning said first and said second workpieces, said first workpiece is characterized by a first workpiece geometry and said second workpiece is characterized by a second workpiece geometry and said first workpiece geometry is a flat plate geometry and said second workpiece geometry is a flat plate geometry.

3. The method of claim 1 wherein in step (1) of positioning said first and said second workpieces said first workpiece is characterized by a first workpiece geometry and said second workpiece is characterized by a second workpiece geometry and said first workpiece geometry is a tubular geometry and said second workpiece geometry is a tubular geometry.

4. The method of claim 1 wherein said first workpiece and said second workpiece are made of an iron-based alloy selected from the group consisting of mild steel, high yield steel, high strength low alloy steel, thermal mechanical control process steel and high tensile strength steel.

5. The method of claim 1 wherein said weld joint formed in step (2) is a weld joint selected from the group consisting of a butt weld joint, a fillet weld joint, a seam weld joint and a bead-on-plate weld joint.

6. The method of claim 1 wherein said first workpiece is characterized by a first workpiece welder-facing side and said second workpiece is characterized by a second workpiece welder-facing side and in step (2) of insulating said weld joint, said synthetic insulator is applied to said first workpiece welder-facing side adjacent to said weld joint.

7. The method of claim 1 wherein in step (2) of insulating said weld joint said synthetic insulator is applied to said first weld joint side.

8. The method of claim 1 wherein in step (2) of insulating said weld joint, said synthetic insulator is applied to both said first weld joint side and to said second weld joint side.

9. The method of claim 1 wherein step (2) of insulating said weld joint with said synthetic insulator further includes selecting said synthetic insulator so that said synthetic insulator can withstand elevated welding temperatures in excess of about 1200° C.

10. The method of claim 9 wherein step (2) of insulating said weld joint with said synthetic insulator further includes selecting said synthetic insulator so that said synthetic insulator is further characterized by a synthetic insulator air permeability and said synthetic insulator air permeability is in the range of from about $40m^3/m^2$ in to about $1m^3/m^2$min, more preferably in the range of from about $38m^3/m^2$min to about $5m^3/m^2$min and most preferably in the range of from about $12m^3/m^2$min to about $5m^3/m^2$min.

11. The method of claim 9 wherein step (2) of insulating said weld joint with said synthetic insulator further includes providing said synthetic insulator in the form of a fabric woven from alumina-boria-silica fibers.

12. The method of claim 9 wherein step (2) of insulating said weld joint with said synthetic insulator further includes providing said synthetic insulator in the form of a mixture of alumina-boria-silica fibers and silicone rubber.

13. The method of claim 9 wherein said synthetic insulator is flexible and said first workpiece is characterized by a first workpiece shape and, in step (2), said synthetic insulator is shaped to conform to said first workpiece shape.

14. The method of claim 1 wherein step (2) of insulating said weld joint further comprises applying multiple layers of said synthetic insulator to said first workpiece to be welded.

15. The method of claim 1 further comprising a step of heating said weld joint to a weld joint temperature and wherein said weld joint temperature is selected so that said weld joint temperature is greater than ambient temperature but less than any temperature at which the material being welded undergoes a solid-solid phase transformation.

16. The method of claim 1 further comprising a step (4) of removing said synthetic insulator for reuse.

17. An apparatus including a synthetic insulator in combination with first and second workpieces for insulating a wet shielded metal arc weld at a weld joint where a first workpiece to be welded contacts a second workpiece to be welded comprising:
 (1) a synthetic insulator for insulating said weld joint positioned at a synthetic insulator location displaced with respect to said weld joint so that said weld joint remains visible to a welder using said apparatus and which can withstand an elevated welding temperature; and
 (2) a synthetic insulator holder for holding said synthetic insulator in thermal contact with said weld joint.

18. The apparatus of claim 17 wherein said first workpiece is characterized by a first workpiece geometry, said second workpiece is characterized by a second workpiece geometry and said first workpiece geometry is a flat plate geometry and said second workpiece geometry is a flat plate geometry and said synthetic insulator conforms to said flat plate geometry.

19. The apparatus of claim 17 wherein said first workpiece is characterized by a first workpiece geometry and said second workpiece is characterized by a second workpiece geometry and said first workpiece geometry is a tubular geometry and said second workpiece geometry is a tubular geometry and said synthetic insulator conforms to said tubular geometry.

20. The apparatus of claim 17 wherein said first workpiece and said second workpiece are made of an iron-based alloy selected form the group consisting of mild steel, high yield steel, high strength low alloy steel, thermal mechanical control process steel and high tensile strength steel.

21. The apparatus of claim 17 wherein said first workpiece is characterized by a first workpiece welder-facing side and said second workpiece is characterized by a second workpiece welder-facing side and said synthetic insulator is in thermal contact with said first workpiece welder-facing side.

22. The apparatus of claim 17 wherein said synthetic insulator can withstand welding temperatures greater than about 1200° C.

23. The apparatus of claim 17 wherein said synthetic insulator is further characterized by a synthetic insulator air permeability and said synthetic insulator air permeability is in the range of from about $40^3/m^2$min to about $1m^3/m^2$min, more preferably in the range of from about $38m^3/m^2$min to about $5m^3/m^2$min and most preferably in the range of from about $12m^3/m^2$min to about $5m^3/m^2$min.

24. The apparatus of claim 17 wherein said synthetic insulator is a fabric woven from alumina-boria-silica fibers.

25. The apparatus of claim 17 wherein said synthetic insulator is a mixture of alumina-boria-silica fibers and silicone rubber.

26. The apparatus of claim 17 wherein said synthetic insulator further comprises multiple layers of a synthetic insulator material.

27. The apparatus of claim 17 further including a heater for maintaining said weld joint at a weld joint temperature and wherein said weld joint temperature is greater than ambient temperature but less than any temperature at which the material being welded undergoes a solid-solid phase transformation.

28. The apparatus of claim 17 wherein said heater is an electrical resistance heater.

29. The apparatus of claim 17 wherein said synthetic insulator is reusable.

30. The apparatus of claim 17 wherein said synthetic insulator holder is an adjustable radius clamp to hold said synthetic insulator in thermal contact with a tubular workpiece.

31. The apparatus of claim 17 wherein said synthetic insulator holder further includes a fastener to hold said synthetic insulator in thermal contact with a flat plate workpiece.

* * * * *

UNITED STATES PATENT AND TRADEMARK OFFICE
CERTIFICATE OF CORRECTION

PATENT NO. : 5,412,176  Page 1 of 2
DATED : May 2, 1995
INVENTOR(S) : Patrick J. Keenan It is certified that error appears in the above-indentified patent and that said Letters Patent is hereby corrected as shown below:

The sheet of drawing, consisting of figure 5, should be deleted to appear as per attached sheet.

Column 5, line 13: after "welding" (first occurrence) insert -- , --.
Column 9, line 57: change "TM", to -- ™ --.
Column 9, line 60: change "TM", to -- ™ --.

Signed and Sealed this

Eleventh Day of July, 1995

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 5,412,176
DATED : May 2, 1995
INVENTOR(S) : Patrick J. Keenan

It is certified that error appears in the above-identified patent and that said Letters Patent is hereby corrected as shown below:

```
Title page, abstract, line 2: change "welds" to --weld--.
Column 2, line 7:  after "C.", delete ")".
Column 2, line 7:  after "steel", insert --)--.
Column 5, line 37: after "weld", delete "joint".
Column 14, line 45: after "selected", change "form" to
--from--.
```

Signed and Sealed this

Twenty-third Day of January, 1996

Attest:

BRUCE LEHMAN

*Attesting Officer*     *Commissioner of Patents and Trademarks*